INVENTOR.
AAGE W. MORTENSEN
BY
Bacon & Thomas
ATTORNEYS

June 10, 1969  A. W. MORTENSEN  3,448,530
METHOD AND APPARATUS FOR CONDITIONING LOGS
TO BE CUT INTO VENEER
Filed March 21, 1967  Sheet 3 of 5

INVENTOR
AAGE W. MORTENSEN
BY Bacon & Thomas ATTORNEYS

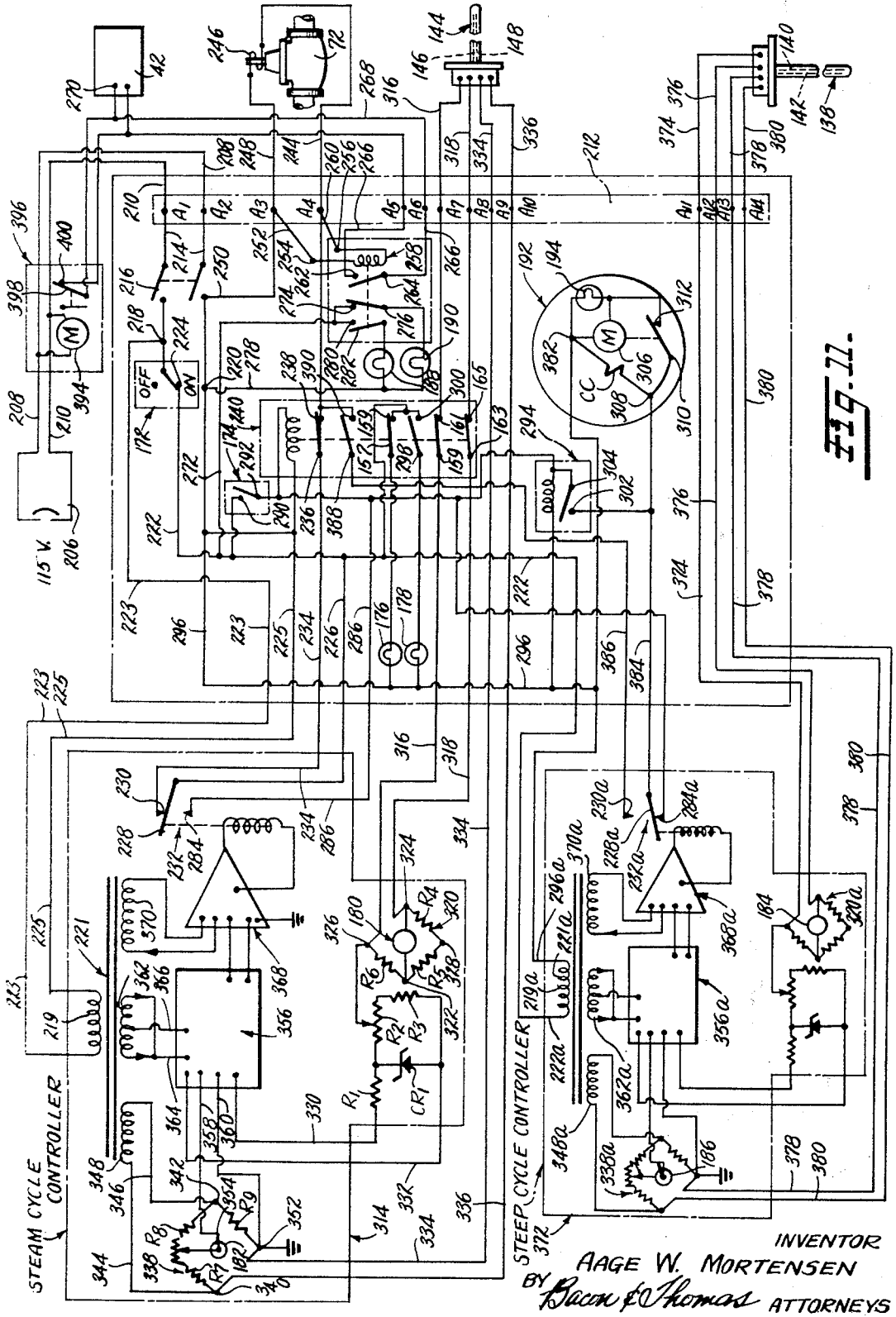

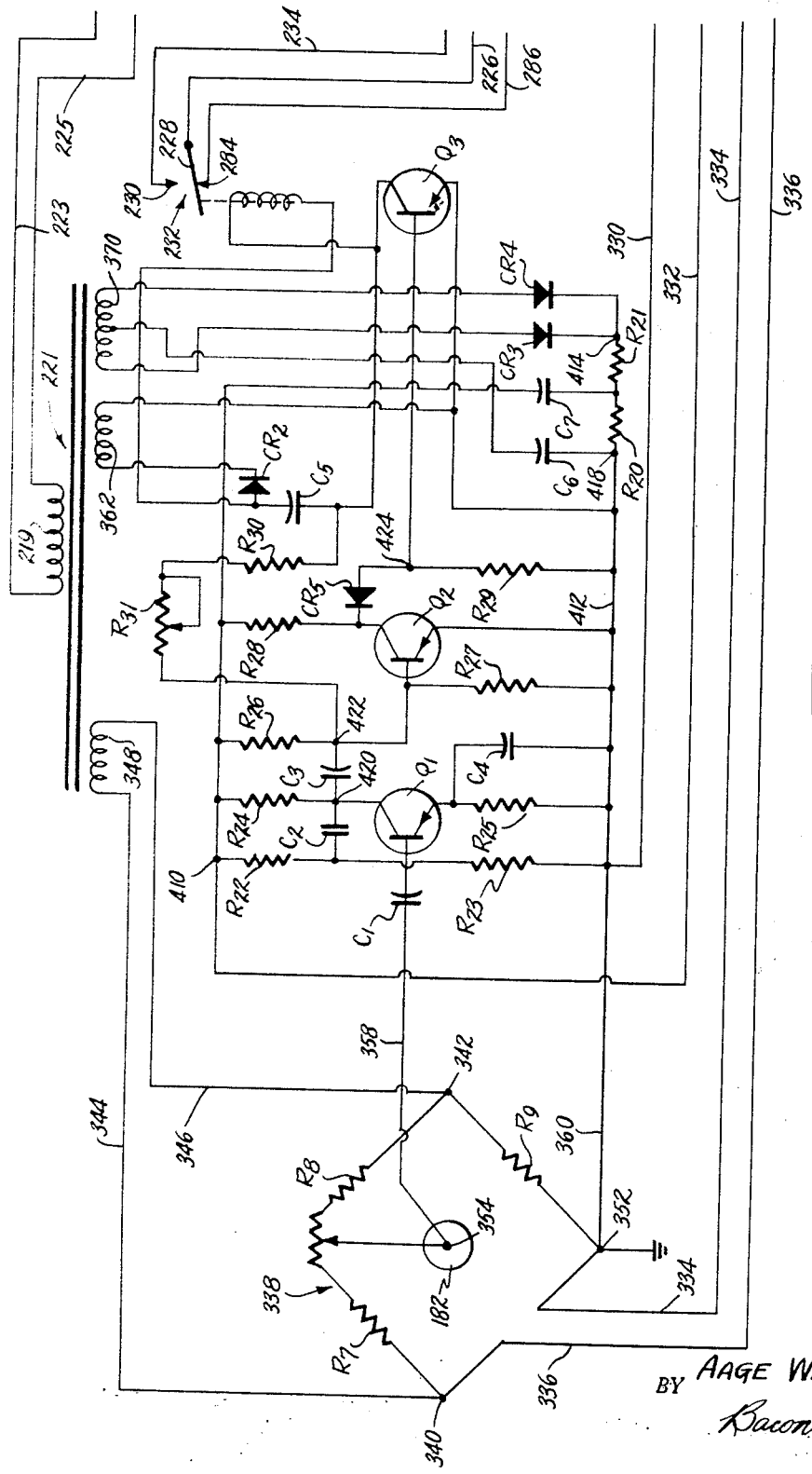

United States Patent Office 3,448,530
Patented June 10, 1969

3,448,530
METHOD AND APPARATUS FOR CONDITIONING LOGS TO BE CUT INTO VENEER
Aage W. Mortensen, 2310 NW. 24th Ave., Portland, Oreg. 97210
Filed Mar. 21, 1967, Ser. No. 624,907
Int. Cl. B01f 3/06
U.S. Cl. 34—13.8      34 Claims

ABSTRACT OF THE DISCLOSURE

Method and apparatus for uniformly heating and saturating logs or "blocks" in a closed vault to condition the same to be cut into veneer by subjecting the logs to a steaming cycle, a steeping cycle and, if necessary, an optional holding cycle.

---

The present method is based primarily upon the discovery that the numerous variable factors involved in conditioning logs for veneer cutting, such as, variations in moisture content, size of the logs, log density, log temperature, etc., can be compensated for by using a certain temperature valve of the steam condensate as the criteria for determining the duration of the steaming cycle. Such criteria can only be determined experimentally and varies with different species of wood. For example, for southern pine, the preferred condensate temperature value is 125° F., and the duration of the steaming cycle is five-and-three-quarter hours to eight hours.

A schedule control panel and control system comprising electrical components is pre-set to respond to a given value of temperature condensate, which is measured by a sensor in the condensate trench, so that the steam supply is automatically shut off when the condensate reaches the stated value. The steeping cycle is automatically initiated at the end of the steaming cycle. An atmosphere temperature sensor in the vault controls the supply of steam to the vault in accordance with temperature and time duration values pre-set on the schedule control panel. These values also vary with the species of wood and can only be experimentally determined. For example, for North Carolina grown southern pine, steam is injected when the vault temperature is 135° F. and is shut-off at 145° F., over a minimum steeping period of about two-and-one-half hours.

At the end of the steeping cycle, if the lathes are not ready to receive the conditioned logs, the process continues to maintain the desired vault temperature and preserves the logs in ideal condition until removed. High moisture content steam is used during all cycles of the schedule.

Uniform heating and saturation of the logs is obtained by stacking the logs spaced from the bottom of the vault and with their opposite ends spaced from the side walls of the vault. Steam distribution pipes with spaced nozzles that produce a generally flat, fan-shaped jet are mounted along each side wall near the ceiling. Saturated steam having 20% to 70% moisture by weight and preferably 55%; and under a pressure of 40 to 100 p.s.i.g., and preferably 60 p.s.i.g. is discharged through the nozzles at the rate of about 0.4 to 0.5 and preferably 0.46 pound of steam per hour per cubic foot of volume of the vault. The steam generally expands, forming a dense blanket of wet steam along the entire length and height of side walls at the opposite ends of the logs. The pressure impinges the jets against the floor with high velocity and produces a high state of turbulence, forcing steam between the logs from side to side, and causing circulation of the steam beneath the logs and upwardly around the logs.

BACKGROUND OF THE INVENTION

In the past, difficulties have been encountered in the plywood and veneer industry in cutting logs to produce high-quality veneer from wood of both hard and soft species. These problems are caused by the inherent characteristics of the wood fiber structure of the species. For example, the presence in the wood of hard or ingrown knots, alternating bands of soft springwood and hard summerwood, and areas of cross-grain all may contribute to a lower recovery rate of veneer as the sheets are peeled at the lathe, unless the logs have been properly conditioned.

Thus, in the peeling operation, the knots may break and fall from the sheet, leaving undesirable holes, or causing the sheet to tear. Even if retained, the knots often cause gouges in the veneer from the knife blade, or become the location of a cupped surface in the sheet. The alternating bands of soft and hard wood tend to cause chatter at the lathe knife, and thereby result in ridges or pockmarks on the sheet, splits or cracks along its edge, or tears across the entire sheet surface. Likewise, the areas of cross-grain may cause splits and tears in the peeled sheet. Furthermore, as the peeling operation progresses to the center of the log, the presence of any of the above fiber characteristics may cause the log to split into pieces or spin out in the lathe.

In order to overcome these difficulties, it has become customary in the veneer industry to heat the logs or wood blocks in order to soften or plasticize them so that they may be more easily peeled into high-quality veneer. It is also becoming prevalent practice in certain geographical areas to operate in the winter by heating frozen logs in order that veneer operations may continue throughout all seasons.

The proper degree of heating of the wood softens the wood structure, particularly the hard knots and rings of summerwood. However, care is necessary in such heating operations since logs heated to an insufficient degree will not be noticeably softened. At the same time, application of excessive amount of heat tends to destroy the wood fibers and, therefore, cause disintegration of the wood structure and make the log ends difficult to chuck in a lathe.

Nevertheless, as logs of poorer quality are appearing in larger percentages at veneer plants, log heating processes are attaining increased significance. At present, the industry considers it essential to heat all logs from certain growth areas before the veneer peeling operation; and of noticeable advantage to heat logs before peeling regardless of the area of growth.

Field of the invention

The present invention relates to a method and apparatus for heating and plasticising logs, and where a log moisture depletion exists to resaturate and heat the logs to the proper state of plasticity for peeling into high quality veneer for manufacturing plywood panels.

Description of the prior art

It has been impossible with prior log treating methods and apparatus to predetermine the amount of time or temperature required to attain "ideal" log plasticizing, because of the many variable factors involved. Experience in operating the equipment was the governing factor, and this has left much to be desired, as is evidenced by the substantial amount of waste, poor quality veneer and operating problems resulting from improper conditioning of the logs.

One of the earliest types of such log heating operations apparently originated in the hardwood veneer industry. In this practice, hardwood logs were immersed in hot water vats and anchored below the surface by chains. The water was generally maintained at a temperature ranging between 180° and 212° F., depending upon the specie of the wood being heated, and the resulting temperature differential between the water and the logs caused heat transfer to the logs. In addition, since heat travels through moisture saturated wood fibers at a higher rate than through dry fibers, the water bath tended to resaturate partially dried logs and thereby implemented the operation. There was present, however, the danger that oversaturating the logs would result in their ends becoming too soft or soggy for chucking into the lathe. Furthermore, as large volume peeling and drying operations became common in the veneer industry, the heating of logs in vats became impractical timewise. Thus, the handling, high costs, time and extensive space and facilities involved were all prohibitive of large volume vat heating operations.

Accordingly, the industry turned to the use of concrete steaming vaults, the dimensions of which are governed by mill production capacity, by whether logs are heated tree length or cut into blocks about 8.5 feet in length, typical vault dimensions being approximately 75 feet long, 14 feet high, and 12 feet wide, as log heating receptacles. These above-ground vaults, which no doubt derived their general appearance and dimensions from lumber kilns, are usually stacked full of veneer blocks, through one open end, by lift trucks.

The logs or blocks are generally about eight-and-one-half feet in length, and in order to get the most uniform results, are generally sorted into diameter ranges, or as to fresh-cut, dry, clear, rough, sound and over-mature classifications of a given species. However, due to time and cost involved in such grading procedure, and in order to limit the number of vaults required, many mills will mix all of the above classifications of a given species into one vault, suffering a loss condition in uniformity. Logs so graded (or not graded) are used in charging a vault at one time, being stacked directly on the vault floor or slightly elevated on widely spaced supports. The most carefully constructed vaults are closed by a tight fitting door and thereby sealed except for vent openings in the roof and a small opening in one of the walls for drainage of condensed steam or water.

Various heating mediums have been used with such prior vaults, including a hot water spray, dry steam, or dry steam and a hot water spray. However, limitations are attendant in the use of all of the above-mentioned heating methods.

For example, by heating water to 180° F., pumping this water into the vault under pressure, and spraying the water over the logs, an effort is made to duplicate the results obtained by a hot water immersion bath. However, such a process will not give complete moisture coverage of all the logs nor result in a uniform temperature gradient and uniform degree of saturation throughout the stack. The spotty results which are thus attained, the higher cost involved in the use of hot water rather than steam, and the mechanical difficulty in continuously filtering and recirculating the water make this type of process unsatisfactory, even though it will produce some degree of softening in the logs.

The use of dry steam, for example, supplied directly from a conventional boiler or steam generator, as a heating medium in such vaults is also known in the industry. Use of this heating medium results in a faster heating which is desirable in high volume operations. However, the dry steam creates a low humidity atmosphere within the vault, absorbing moisture from the logs, and causing excessive drying at the ends of the logs. This results in poor heat transfer through the logs and, therefore, a high temperature gradient from the log ends to their center. It is difficult to peel veneer of a uniform thickness from such a log and the dry ends often result in splits, cracks, or corrugations at the edge of the veneer sheet. Therefore, use of dry steam is considered to be no more satisfactory than immersion or a hot water spray.

Another industry practice involves the injection of steam into the vault as a mixture with a hot water spray. Since the steam contains latent heat, this method is more economical and faster than the hot water spray used alone. The major difficulty with this system is that low fluid flow velocity through the distribution lines causes an uneven distribution of moisture in the steam and precludes an even application of heat and moisture throughout the vault. Therefore, spotty results are caused by non-uniform moisture coverage of the logs and varying temperature layers within the vault. Then there is also the problem of continually filtering wood fibers, bark, etc., from the water in order to recirculate it.

In addition, there is no method or criteria, when using any of the above processes, to determine when the logs of a particular vault charge have attained an ideal condition of plasticity. The heating time varies from mill to mill but is usually determined by an estimate based upon previous experience with vault loads of similar log specie, diameter, moisture condition, and given percentage of full charge of the vault. Furthermore, it is general practice to open the vault at the conclusion of the selected heating period. Then, depending upon the peeling schedule, the logs may be immediately delivered to the lathe or may be held in the vault for a long period of time. Naturally, any such delay in peeling is accompanied by a change in the character of the logs away from the softened condition present at the time the vault was first opened.

Thus, the log heating practices of the prior art all result in plasticizing the logs to some degree. However, none of the practices outlined above eliminates the high percentage of the veneer cutting losses and inferior quality veneer traceable to the troublesome wood fiber characteristics discussed above.

SUMMARY OF THE INVENTION

The present invention relates to a method and apparatus for effectively heating and, in the case of low moisture content logs or blocks, re-saturating and heating, the logs to condition the same for cutting into veneer, with retention of the life and soundness of the fiber structure in the veneer. In order to obtain a clear understanding of the novel features of the present invention, it is necessary to consider certain known relationships and variables which affect the transfer of heat through wood. The main variables include the temperature and the type of heating medium used in treating the logs, the fiber moisture content of the wood, the grain direction of the wood, and the density or specific gravity of the wood.

Moisture is contained in wood, both in the fibers and in the cell structures located between the fibers. However, it is primarily the moisture in the fibers that affects heat transfer through the wood. According to Forest Products Laboratory Report No. 2149, U.S.D.A., the fiber saturation point of all wood species is 30% of dry weight. This report also reveals that the transfer of heat through wood will be proportionally greater as the moisture content of the wood is greater, until the fiber saturation point of the wood is reached. Differences in moisture content above the fiber saturation point have no significant effect upon the rate of heating within the range of temperatures of present interest. It is generally known that the rate of moisture absorption and heat transfer lengthwise in a log is about two-and-one-half times faster than at right angles to the log axis. Hence, ample moisture is made available at the opposite ends of the logs and all remaining surfaces thereof to insure resaturation. It is also of interest that the rate of heat transfer varies inversely with the specific gravity of the species of wood being conditioned.

More specifically, the invention relates to a method and apparatus for uniformly heating and, in the case of low moisture content or dry logs or blocks, resaturating and uniformly heating in a closed vault to condition the same to be cut into veneer by subjecting the logs to a steaming cycle, a steeping cycle and, if necessary, an optional holding cycle.

As has been previously stated, the present method is based primarily upon the discovery that the numerous variable factors involved in conditioning logs for veneer cutting, such as, variations in moisture content, size of the logs, log density, log temperature, etc., can be compensated for by using a certain temperature value of the steam condensate as the criteria for determining the duration of the steaming cycle. In order to most effectively utilize such discovery, it has been coupled with the concept of preferably employing saturated steam in excess of the percentage of natural growth moisture content of wood. In other words, the present method preferably provides steam with a moisture content in excess of 30% by weight. Additionally, and conducive to best results, the high moisture content steam is introduced into the vault at a rate lower than the natural heat flow rate of the wood and lower than the natural moisture rate of dry or low moisture content blocks or logs, so that the logs will rapidly absorb the heat and moisture without destructive effect on the fibers. Of course, as the logs approach their fiber saturation point, less and less of the moisture content of the steam will be absorbed by the logs.

Uniform heating and saturation of the logs is obtained by stacking the logs upon centrally located supports to space the logs from the bottom of the vault, and with their opposite ends spaced from the side walls of the vault. Steam distribution pipes with spaced nozzles that produce a generally flat, fan-shaped jet are mounted along each side wall near the ceiling. Steam is supplied to the jets at a uniform pressure, and distribution line pressure drop is compensated for by varying the distance between nozzles, or varying the size of the nozzle orifices to provide a substantially uniform supply of steam at all discharge points in the vault. The steam upon leaving the nozzles greatly expands, forming a dense blanket of wet steam along the entire length and height of the vault side walls at the opposite ends of the logs. The jets impinge against the floor with such velocity that a high state of turbulence is produced, forcing steam inwardly between the logs from side to side of the vault and causing circulation of the steam to beneath the logs and then upwardly around the logs to the ceiling of the vault.

A schedule control panel and control system comprising electrical components and a steam supply control valve is pre-set to respond to a given value of temperature condensate, which is measured by a temperature sensing bulb in a condensate trench in the vault, so that the steam supply valve is automatically shut off when the condensate reaches the pre-set value. The steeping cycle is automatically initiated at the end of the steaming cycle. An atmosphere temperature sensing bulb is mounted near the ceiling in the vault and controls the same steam supply valve in accordance with temperature and time duration values pre-set on the schedule control panel. The steeping cycle automatically maintains the atmosphere in the vault at a temperature slightly higher than the prescribed condensate temperature value to allow the logs to become uniformly heated and saturated from exterior to core. The steeping cycle is continued for a pre-set period of time at the end of which the logs are ready to be removed from the vault. If the lathes are not ready to receive the conditioned blocks, the steeping cycle continues beyond the pre-set minimum signal, maintaining the ideal vault atmospheric temperature and moisture conditions, and preserving the blocks in ideal condition until the steeping control switch is manually turned off and the blocks removed from the vault.

A master schedule control panel is associated with an electrical control circuit and has signal means for indicating when the steaming cycle and steeping cycle, respectively, are in progress; signal means for indicating when the steam supply valve is open and when it is closed; a pre-settable thermometer that responds to a given condensate temperature for determining the duration of the steaming cycle; a pre-settable steeping thermometer that responds to a given vault atmosphere temperature for maintaining the temperature in the vault at a desired steeping value after termination of the steaming cycle; a manually adjustable timer for presetting the duration of the minimum required steeping cycle; a signal for indicating the time remaining in the minimum steeping cycle; and a by-pass push button switch for initiating a holding cycle. This holding cycle feature is to permit re-establishing of the steeping cycle in a vault that may have been opened and partially unloaded, and then closed again still partially charged, for unloading at a later time.

OBJECTS OF THE INVENTION

The principal object of the invention is to provide a method and apparatus for heating and saturating logs that will eliminate the great waste of unusable veneer inherently resulting from the use of prior methods and apparatus.

Another important object is to provide a method and apparatus for ideally conditioning veneer logs, which employs criteria that automatically compensates for variations in the moisture content of the logs, their hardness, size, temperature, etc.

Another object is to provide a method and apparatus for conditioning veneer logs wherein the duration of the steaming cycle is controlled in accordance with a given steam condensate temperature value.

Another object is to provide an improved heating method and apparatus that will allow the mixing together in one vault, one specie of logs or blocks in a wider range of diameters, or that are fresh cut, dry, clear, rough, sound or over-mature and capable of uniformly heating, and re-saturating and heating dry or low moisture content logs or blocks, throughout said blocks, regardless of the location in the vault, and of duplicating these results in each successive vault load, regardless of the size of the charge in the vault, or atmospheric conditions or temperature of the blocks or logs.

Another object is to provide an improved log heating vault wherein a heating medium is employed that will produce an atmosphere of uniform, high moisture content and temperature, which completely envelopes the logs.

Another object is to provide an improved log heating vault wherein a dense blanket of steam is introduced and maintained between the ends of the logs and the vault side walls throughout the log steaming cycle.

A further object is to provide a heating method and apparatus wherein the logs, after attaining a condition of suitable plasticity are allowed to steep for a pre-selected time interval, whereby a substantially uniform temperature gradient and saturation is obtained throughout each log.

A still further object is to provide a heating method and apparatus wherein the logs can be maintained at the ideal condition of plasticity for an extended length of time in order to accommodate latitude in the veneer cutting schedule.

Still another object is to provide an improved process and apparatus for quickly, effectively, and economically heating and thereby plasticizing logs of the type used in veneer production.

Other objects and advantages of the invention will be apparent from the accompanying drawings and description appearing hereinafter.

BRIEF DESCRIPTION OF THE DRAWINGS

FIG. 2 is a transverse cross-sectional view through the vault taken along the line 2—2 of FIG. 1;

FIG. 3 is a longitudinal sectional view through the vault taken along the line 3—3 of FIG. 2;

FIG. 4 is an enlarged fragmentary sectional plan view of the trench in the vault floor and at the rear of the vault showing a sleeve with a condensate temperature-sensing bulb disposed therein, taken along the line 4—4 of FIG. 3;

FIG. 11 is a schematic view of the principal electrically operated elements and the circuitry of the automatic control system for the vault; and FIG. 12 is a schematic diagram of the electrical circuit for the steam cycle controller for the vault.

DESCRIPTION OF THE PREFERRED EMBODIMENT

Figures 1, 5, 8:
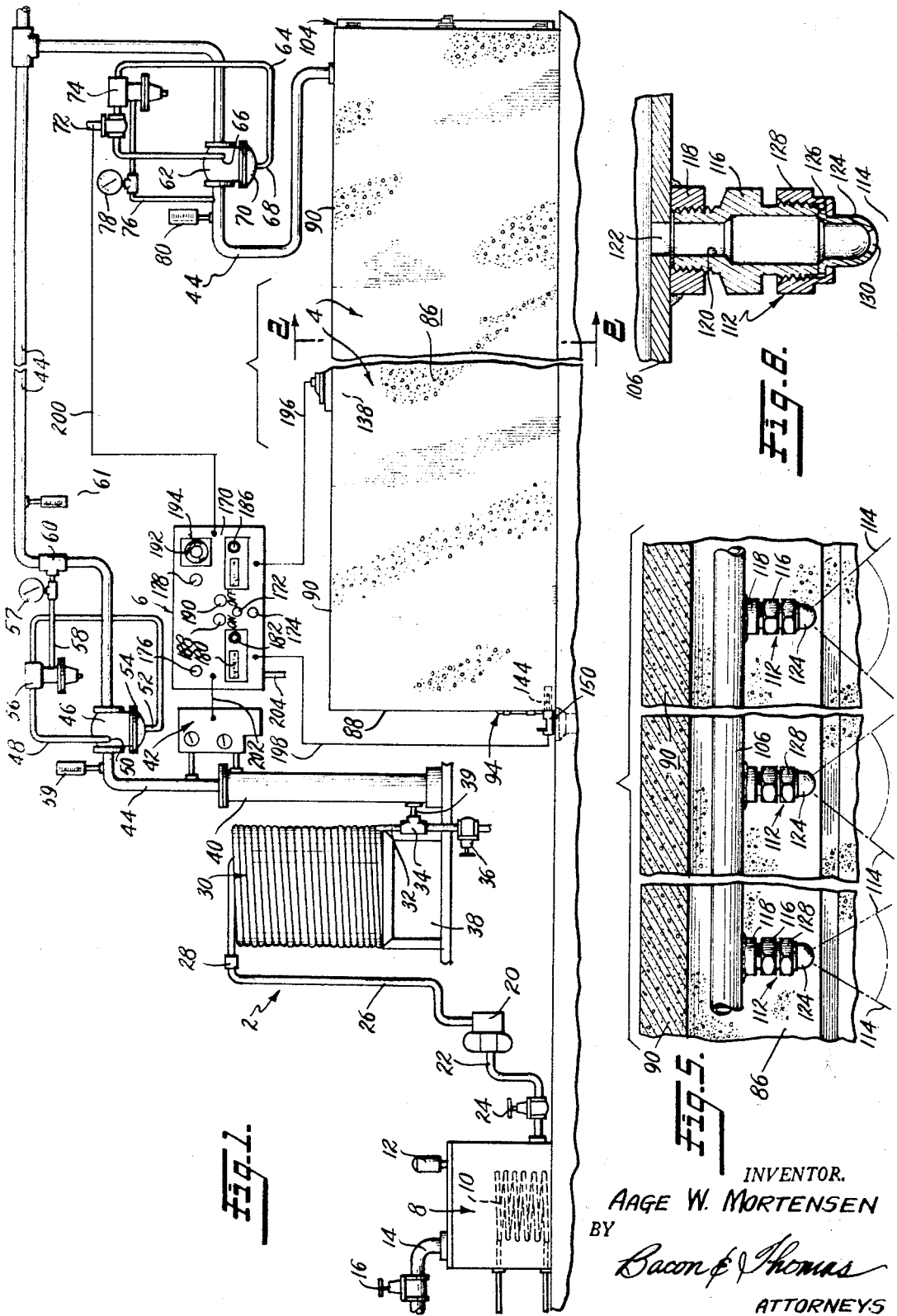
FIG. 1 is a diagrammatic view of apparatus, including a steaming vault, a schedule control panel, and steam-generating apparatus, embodying the principles of the present invention.
FIG. 5 is an enlarged fragmentary sectional view showing a portion of one of the steam distribution lines and spaced nozzles with different size orifices mounted thereon, taken along the line 5—5 of FIG. 2.
FIG. 8 is a fragmentary vertical sectional view, taken along the line 8—8 of FIG. 7.

Referring to FIG. 1 of the drawings, a steam generating unit is generally identified by the numeral 2 and supplies highly saturated steam to a log steaming vault 4 through a piping system that will be described in further detail later. The operation of the steam generator 2, and the log steaming vault 4 are controlled by an electronic schedule control unit 6, which regulates the supply of steam to the vault 4 in response to certain measured parameters to effect steaming and steeping of the logs, in a manner explained in further detail hereinafter. While a single vault is shown and will be described in connection with the present invention, it will be understood that a single steam generator of adequate capacity can be connected with a plurality of similar vaults, and where the number of vaults exceeds the capacity of one steam generator, the steam generator will be interconnected with one or more additional generators in the multiples of units as required to total the capacity required by the total number of vaults.

The steam generator 2 and the components associated therewith for supplying feed water thereto are conventional and do not form any part of the present invention, except that the steam generator supplies the highly saturated steam required for steaming and steeping the logs in the vault 4, under the overall control of the control unit 6. For illustrative purposes, a conventional feed water heater 8 is shown containing a heating coil 10 and having a de-aerator 12. It is preferable to use water that has been subjected to the action of a water softener, and such water is supplied to the feed water heater 8 through a pipe 14 containing a shut-off valve 16. The feed water heater 8 is connected with a positive displacement pump 20 by a pipe 22 containing a shut-off valve 24.

Water at a temperature slightly under 212° F. is delivered by the pump 20 through a pipe 26 to the inlet 28 of a heating coil 30. The pump 20 delivers a uniform volume of water to the heating coil 30 at a rate sufficient to maintain a wet tube heating coil condition under all operating loads. The pump 20 includes an automatically operable by-pass valve, not shown, for diverting water from the discharge side to the inlet side thereof, as when the system demand is reduced so that the full output of the pump is not required. It will be understood that suitable means is also provided to maintain the proper ratio of fuel to the water input. The heating coil 30 is spirally wound and has an outlet 32 at its lower end to which a pipe-T 34 is connected. A blow-down valve 36 is connected to the other side of the pipe-T 32.

The softened de-aerated water is circulated through the heating coil 30 and flows downwardly toward a combustion chamber 38 so that the fluid in the coil is subjected to the highest temperature just before it reaches the coil outlet 32. Thus, the water undergoes progressive heating as it flows downwardly through the coil 30. Steam is generated during the passage of the fluid through the heating coil 30 and remains entrained in the water as the mixture is delivered from the discharge and 32 of the coil through a pipe nipple 39 into a discharge stand pipe 40. The mixture may be discharged into the stand pipe 40 at a pressure of about 150 p.s.i.g. at a temperature of about 370° F., depending upon the requirements of the steaming vault 4.

A steam pressure switch 42 is connected with the stand pipe 40 and acts through a series of conventional controls, not shown (and which form no part of the present invention), to automatically control the water pump 20 as well as to control the starting and firing of fuel supplied to the steam generator unit 2, by means also not shown. The steam generator 2 briefly described above is of the type manufactured by the Clayton Manufacturing Company, El Monte, Calif., Model No. ROG-175. However, the unit as employed in the present invention, does not require and therefore is not equipped with a steam separator. The customary steam separator is purposely omitted because of the fact that the steam generator unit 2 must serve as a source of steam having a high moisture content, ranging up to 70% liquid by weight.

A pipe 44 is connected to the upper end of the stand pipe 40 and has a master steam pressure regulating diaphragm valve 46 connected therein. The valve 46 is conventional and is spring-loaded to close and steam pressure operated to open. To this end, a by-pass tube 48 has one end 50 connected with the inlet side of the valve 46 and its other end 52 connected with the cover 54 of the valve 46, which serves as a diaphragm pressure chamber. A differential pressure pilot valve 56, also of conventional construction, is connected in the by-pass tube 48. When the pilot valve 56 is actuated, steam under pressure is permitted to flow through the by-pass tube 48 from the inlet side of the master steam valve 46 to the diaphragm pressure chamber 54 to act against the closure spring and thereby open the master valve. In this manner, the master valve 46 operates as a modulating type pressure regulating valve to maintain a pre-selected steam pressure in the pipe 44 on the discharge side of said valve. This pressure may range from 80 p.s.i.g. to 125 p.s.i.g. in accordance with the requirements of a given installation.

The pilot valve 56 has a pressure chamber connected by a tube 58 and a pipe-T 60 with the steam supply pipe 44, whereby the pilot valve 56 responds to the differential in pressure on the inlet and outlet sides of the master steam valve 46. A pressure gauge 57 is connected in the tube 58, and thermometers 59 and 61 are connected in the pipe 44 on the inlet and outlet sides, respectively, of the valve 46.

The main steam pipe 44 supplies steam to one or more vaults 4 and is of a suitable diameter to maintain the necessary pressure and velocity high enough that separation of the liquid and steam in the pipe is prevented. The pipe 44 is connected with the inlet of a spring-closed, diaphragm type steam valve 62 to regulate the pressure and flow of steam into the vault from the pipe 44. The valve 62 is similar in design and operation to the master valve 46. A by-pass tube 64 has one end 66 connected with the inlet of the steam valve 62 and its other end 68 connected with a valve cover 70, which forms a diaphragm pressure chamber. A solenoid operated valve 72 is connected in the by-pass tube 64 in advance of a pressure differential operated pilot valve 74, similar to the pilot valve 56. A tube 76 connects the downstream side of the steam valve 62 with a pressure chamber in the pilot valve 74. The valve 62 may be set to maintain a pressure of 40 p.s.i.g. to 100 p.s.i.g., depending upon the vault requirements.

A pressure gauge 78 is connected in the tube 76. Thus, the pilot valve 74 operates in accordance with the differential pressure across the valve 62 when the solenoid operated valve 72 is opened. The solenoid valve 72 is operated by the control unit 6 in a manner explained later to maintain a constant down-stream pressure upon the steam nozzles 112 within the steaming vault 4 during the periods of steam delivery. A temperature indicator 80 is mounted in the steam pipe 44 on the down-stream side of the steam valve 62.

The details of construction of the steaming vault 4 are best shown in FIGS. 2 and 3. The vault 4 is usually constructed of concrete, but may be of any other durable material of low heat loss, and comprises a floor 82, side walls 84 and 86, an end wall 88 and a ceiling 90 arranged to form an oblong vault about 10' wide, about 12' high and about 75' long. However, these dimensions are not critical and the vault may be lower, wider, or longer to conform to mill production requirements, or mill unloading facilities, or different lengths of logs or blocks.

Figure 7:
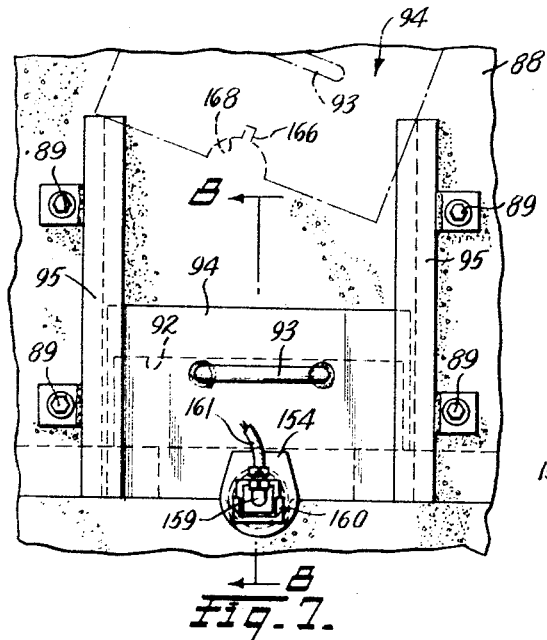
FIG. 7 is a fragmentary elevational view of a portion of the rear wall of the vault showing the condensate temperatures sensing bulb and its protective supporting sleeve and the vault cleanout door.
Figure 8:
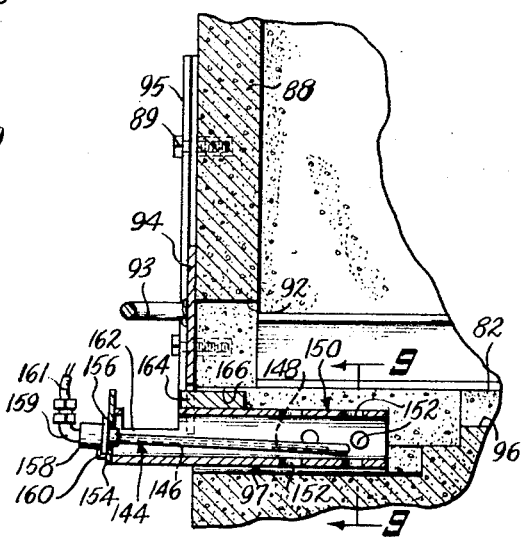

The rear wall 88 has a vault clean-out opening 92, which is generally rectangular in shape. The opening is located at the juncture of the rear wall 88 with the bottomwall 82. The opening 92 is closed by a metal door 94, FIG. 7, slidably mounted in vertical guides 95 secured to the rear wall 88 by bolts 89 and anchors imbedded in said rear wall. The door 94 has a handle 93 for raising the same to open position whenever it is desired to clean out the vault. The door 94 can be readily held in a raised position by simply canting the same in the guides 95 as shown in dot-and-dash lines in FIG. 7. Extending inwardly from and below the opening 92 is a condensate drainage trench 96 in the bottom wall 82. The condensate trench 96 is located in the center of the floor 82 and extends throughout the entire length of the vault 4. In order to facilitate drainage by gravity, the trench 96 is graded slightly downwardly from the front end of the vault to the rear. However, it may down grade toward the front, or toward one side wall, to adapt to the vault terrain.

I-beam sections 98 extend along opposite sides of the trench 96 and are connected together and maintained spaced apart by sections of pipe 100 which are welded at their opposite ends to the vertical webs of the I-beams. The I-beams 98 are a minimum height of 8" and extend throughout the length of the vault and serve as a support for the logs or blocks to be conditioned. Alternatively, a pair of 8" minimum diameter steel pipes (not shown), or 8" minimum height concrete rails (not shown) poured as a part of the concrete floor during the construction of the vault, may be employed for the same purpose. The I-beams 98 are anchored to the vault floor 82 and are spaced from 24" to 30" apart in order that the wheels of a lift truck may span the same during the loading and unloading of logs from the vault. In some instances, it may be desirable to mount the log supports 98 in "floating" relationship to the floor, i.e., without fastening the same to the floor in order that the truck tires will not be easily damaged upon coming into contact with the supports. The steel pipes are less likely to damage the truck tires than the horizontal flanges of I-beams. The central location of the log supports in the vault 4 avoids obstruction to the steam flowing inwardly under the logs, as occurs in prior structures wherein the log supports are located close to the side walls of the vault.

The vault 4 is open at one end 102 to permit the loading of the logs onto the I-beams 98. These logs are preferably piled in the vault 4 transversely of the vault and may completely fill the vault to the extent shown in FIG. 3. The vault opening 102 is closed by a kiln type door 104, so that the interior of the vault 4 constitutes an enclosure or substantially sealed steaming chamber for the logs. Steam is introduced into the vault 4 through a pair of 1" pipes 106 (typical for a 75' vault), which extend for the full length of the vault, as shown in FIG. 3. The pipes 106 are connected by a pipe-T 108, with the steam supply pipe 44.

The pipes 106 are located along the side walls 84 and 86 as close to the ceiling 90 as practicable and are supported by hangers 110. A series of steam nozzles 112 is mounted on each pipe 106 on about 2' centers. The spacing of the nozzles may be greater at the inlet end than at the terminal end of the pipes 106 in order to maintain substantially equal nozzle pressures along the entire length of the vault, as shown in FIG. 3. Alternatively, substantially equal nozzle pressures may be maintained by mounting the nozzles equal distances apart but varying the length of the discharge orifice to produce variable width jets, as in FIG. 5. In any event, the nozzles 112 are so designed that they produce a generally flat-fan-shaped discharge jet, diagrammatically indicated by the lines 114 in FIG. 3, and which lines also show that the jets overlap or merge into each other in a direction toward the vault floor 82.

Figure 6:
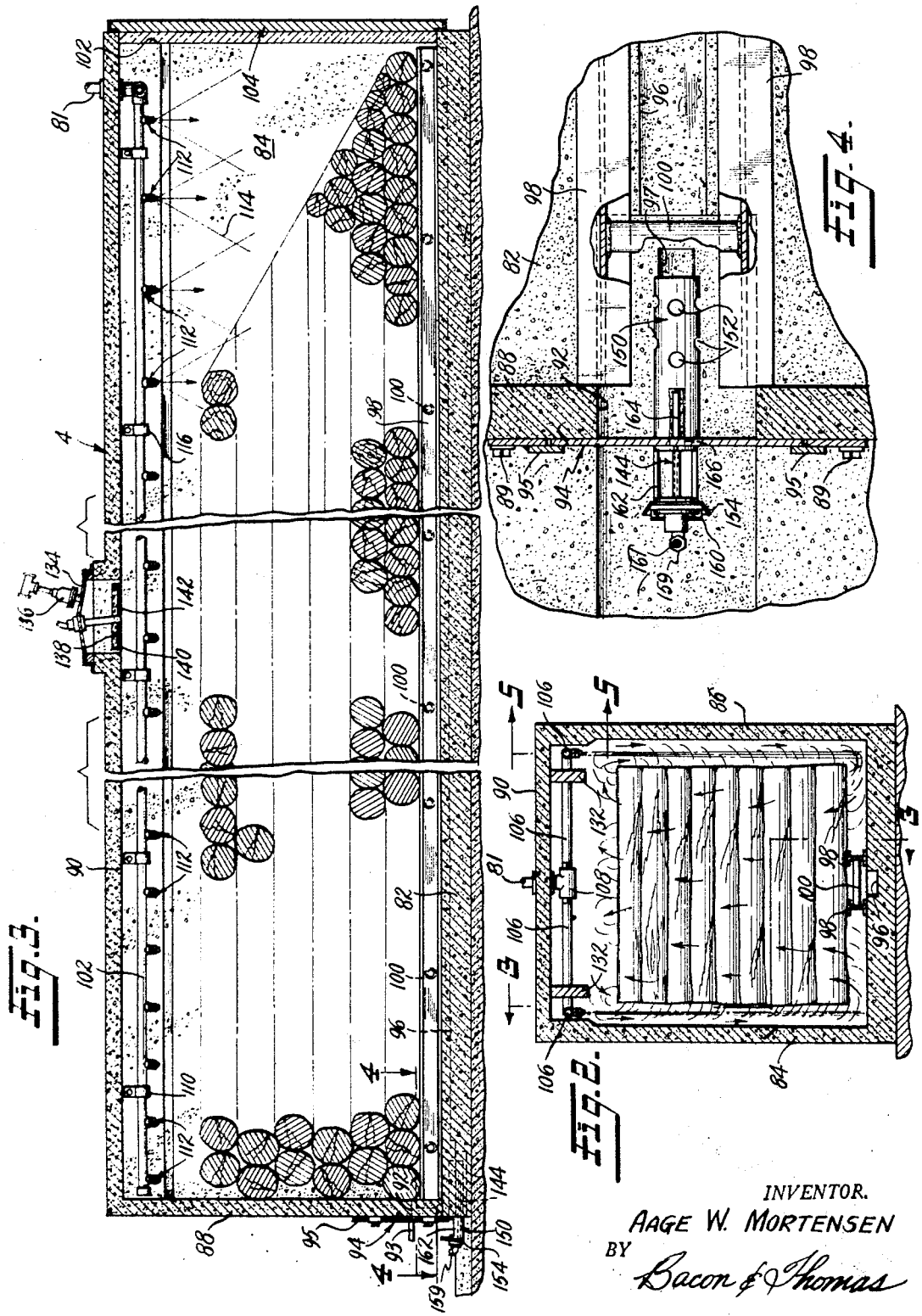
FIG. 6 is a further enlarged vertical sectional view through one of the nozzles, shown in FIG. 5.

FIG. 6 is a detailed cross-sectional view of one of the nozzles 112. As is here shown, each nozzle comprises a body 116, which has a reduced threaded end received in a ring 118 welded to the pipe 106. The body 116 has a passageway 120 that registers with an opening 122 in the pipe 106. A nozzle head 124 has a flange 126 that is clamped against the lower end of nozzle body 116 by a flanged sleeve 128. The nozzle head 124 has a narrow orifice 130 through which the mixture of water and steam are discharged into the vault.

The nozzles 112 are mounted upon the pipes 106 so that the steam is discharged through the orifices 130, straight down toward the floor 82, and with the fan-shaped discharge pattern substantially parallel to the side walls 84 and 86 of the vault, as indicated in FIG. 2. The pressure at the nozzle head 124 may range from 40 to 100 p.s.i.g., according to the volume of the vault 4, but in any event, is always sufficiently high so that the injected steam and water spray imprings with high velocity against the vault floor 82 and forms a dense blanket of steam along the entire length and height of the side walls 84 and 86 of the vault. This is an important feature since it provides a blanket of steam between the opposite ends of the logs and the adjacent side walls 84 and 86 of the vault 4 which contains sufficient pressure to force some of the steam lengthwise between the logs from one side of the vault to the other. Thus, the placement of the steam pipes 108 at the ceiling 90 of the vault, and the introduction of the saturated steam under sufficient pressure to cause the same to impinge against the vault floor 82, produces a highly turbulent circulation of steam within the vault, as indicated by the arrows in FIG. 2. This turbulent circulation action results in complete moisture coverage of all surfaces of the logs within the vault, and most effectively at the ends of the logs where moisture penetration into the logs is least resisted.

The logs may be piled as high as is practicable within the vault 4, usually to within about one foot or two of the ceiling 90. Thet vault 4 can be charged to any desired percentage of its capacity, but for the greatest economy, the vault should be filled except for the slope at the inlet end 102, as shown in FIG. 3. In order to prevent damage to the nozzles 112 while the vault is being loaded or unloaded, bumper strips 132, FIG. 2, are fastened to the ceiling adjacent the pipes 106 and project to a point below the nozzle heads 124.

One or more hatch openings 134, FIG. 3, are provided in the vault ceiling 90. Automatic air vents 136 are mounted in the hatches 134 to release the residual air within the vault 4 as the steam is injected therein. The venting of air from the vault is desirable for the reason that its presence would retard the rapid and uniform heating of the logs.

Also, mounted on one of the hatches 134 is an atmospheric temperature sensing bulb 138 comprising an elongated metal shell containing a pair of thermistor elements 140 and 142. One of the thermistors is electrically connected as one leg of a temperature set bridge circuit in the control unit 6, as will be described later. The other thermistor is electrically connected to a temperature indicating meter, as will also be explained later. The resistance of each thermistor 140 and 142 varies in proportion to temperature changes, in a well-known manner, and thereby produces a change in its associated electrical signal, which is proportional to any change in atmospheric temperature within the vault 4. It will be understood that each electrical circuit may be easily calibrated to display or respond to this temperature measurement in any convenient scale, such as, degrees F.

Figure 9:
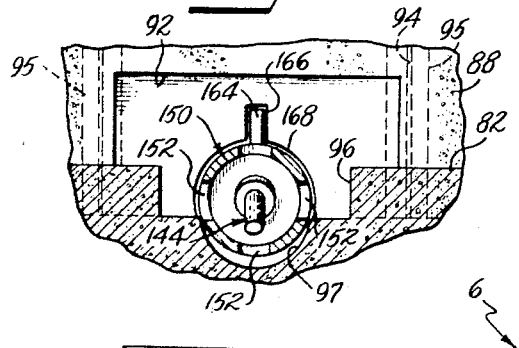
FIG. 9 is a fragmentary vertical sectional view through the condensate sensing bulb and its protective sleeve, taken along the line 9—9 of FIG. 8.
Figure 10:
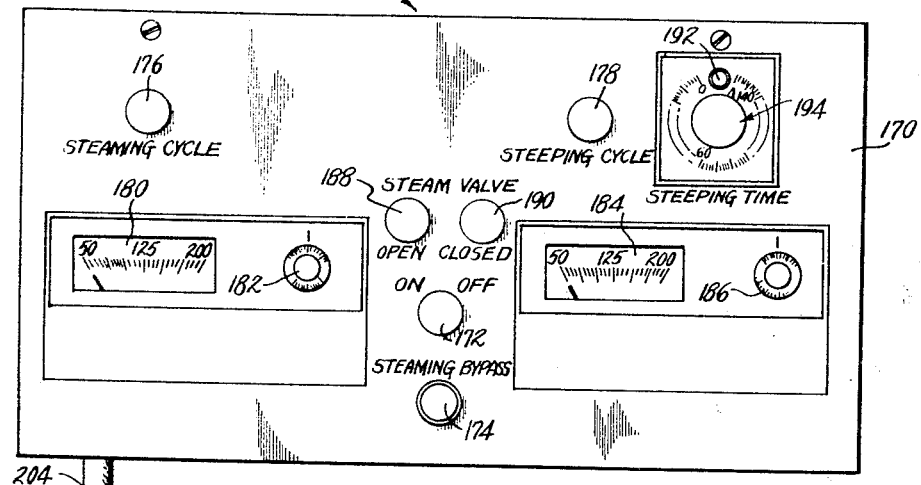
FIG. 10 is an enlarged elevational view of the schedule control panel shown in FIG. 1.

The condensate trench 96, FIG. 8, has a deeper portion 97 at its discharge end, which is depressed below the bottom of the trench and is arcuate or semi-circular in cross section, as shown in FIG. 9. A condensate temperature sensing bulb 144 is mounted in a tubular protective sleeve 150 that rests on the edges of the arcuate portion 97 of the condensate trench 96, but is spaced from the bottom thereof to allow some condensate to flow beneath it. The condensate sensing bulb 144 also contains two thermistors 146 and 148, which sense the temperature of the steam condensate leaving the vault 4 and produce proportional changes in each of the two electrical control circuits associated therewith. Just as with the vault temperature sensing bulb 138, one electrical signal is associated with a temperature indicating meter on the control panel 6, and the second sensing bulb is associated with a branch circuit in the control unit 6, as will be described later.

Referring to FIGS. 4, 8 and 9, the protective sleeve 150 is open at its inner end and has a plurality of openings 152 spaced about its circumference to permit condensate flow through the sleeve. The other end of the sleeve 150 is closed by a plate 154 which is inclined from the vertical and serves as a mounting support for the condensate sensing bulb 144. The plate 154 has an opening 156 through which the sensing bulb 144 extends. The bulb 144 itself is mounted in a flanged plug 158, and the plate 154 has sections of angle iron 160 welded thereto to form a U-shaped support for the flange of the plug 158. The condensate bulb 144 and plug 158 are mounted on the plate 154 so that it is inclined downwardly and inwardly as best shown in FIG. 8. A fitting 159 is mounted on the plug 158 and serves as a conduit for an electric cable 161 connected with the thermistors 146 and 148.

The sleeve 150 is notched on its upper side near the plate 154 to form an overflow opening 162, the horizontal edges of which are disposed in a plane above that of the bulb 144 so that the bulb is normally completely immersed in the condensate flowing from the vault 4. The open end of the sleeve 150 and the holes 152 permit the condensate to enter and flow over and circulate freely about the bulb 144 and to then drain from the sleeve through the lowermost openings 152 and also discharge through the overflow opening 162, which normally is located outside of the rear wall 88. The inclination of the sensing bulb 144 assures contact with the condensate at low flow rates and with a larger proportion of the condensate flow than would be the case if the bulb were horizontal.

A key 164 is welded to the sleeve 150 adjacent the overflow opening 154 and is received in a keyway 166 which extends from a semi-circular notch 168 formed in the lower edge of the door 94 to straddle the sleeve 150. The key 164 and keyway 166 insure that the condensate sensing bulb 144 and sleeve 150 will always be properly oriented with the condensate trench portion 97.

It will be apparent from the foregoing that the condensate sensing bulb 144 can be removed from the sleeve 150 simply by sliding the flanged plug 158 upwardly until it clears the angle members 160 and then withdrawing the bulb through the opening 156 in the plate 154. It will also be apparent that the assembly of the sensing bulb 144 and the sleeve 150 can be bodily removed from the trench portion 97 for inspection, cleaning, etc., by sliding the same outwardly along said trench portion.

The readily removability of the door 94 and of the assembly of the condensate sensing bulb 144 and the sleeve 150, makes it easy to clean out the vault 4 and flush out the condensate trench 96 to dispose of bark, chips or any other matter that has collected in the trench during the run of steaming the logs.

Electronic control apparatus is provided in conjunction with each vault 4 to automatically control the delivery of highly saturated steam to the vault 4 in accordance with differently timed cycles. Basically, these cycles include an initial heating and steaming cycle, which is automatically terminated under the control of the condensate sensing bulb 144 when the temperature of the condensate leaving the vault reaches a pre-selected value corresponding to the particular specie of logs being treated; a steeping cycle of pre-set duration during which the vault atmospheric temperature bulb 138 functions to maintain the temperature within the vault at a pre-selected value, also corresponding to the specie of wood being treated; and an optional holding cycle of any required interval during which saturated steam is intermittently supplied to the vault through the steam pipes 106 in order to maintain the logs at their ideal condition of plasticity. These various cycles will be described in further detail hereinafter.

The electrical circuitry is schematically illustrated in FIGS. 11 and 12. This circuitry is largely housed within the control unit 6, which is preferably located adjacent the steaming vault 4, or at any desired point remote therefrom. The control unit 6 comprises a front panel 170, as shown in FIG. 1, which serves as a mounting base for various indicating and control devices. These include a main on-off switch 172 for the unit, a steaming by-pass push button switch 174, as well as a red signal light 176, which is lit up only when the steaming cycle is in progress. Also mounted upon the control panel 170 is another red light 178 that lights up only during the steeping cycle. A thermometer 180 is mounted on the panel on one side of the on-off switch 172, for indicating the condensate temperature as measured by the condensate sensing bulb 144. A manual control dial 182 is associated with the thermometer 180 for setting the same at a pre-selected condensate temperature value at which the steam supply to the vault 4 is automatically cut off. An identical thermometer 184 is mounted on the panel 170 to the right of the on-off switch 172 for indicating atmospheric temperature within the vault 4, as measured by the atmospheric temperature sensing bulb 138 at the ceiling 90 of the vault 4. A manually operable dial 186 can be set to select a predetermined atmospheric temperature which it is desired to be maintained in the vault 4 during the steeping cycle, and optional holding cycle.

A third red signal light 188 is mounted on the panel 170 and is arranged in the circuit so that it will light up when the master steam valve 46 is open. A green signal light 190 is mounted on the panel 170 adjacent the red signal light 188 and is arranged in the circuit so that it lights up when the master steam valve 46 is closed. A manually settable timer dial 192 is mounted upon the panel 170 to set the period of the steeping cycle and to indicate the minutes remaining in the steeping cycle. The dial 192 has a signal light 194 associated therewith, which is connected in the circuit so that it is lit up only during the steeping cycle.

The electrical connections external of the control unit include electrical cables 196 and 198, which are respectively connected to the atmosphere temperature sensing bulb 138 and the condensate temperature sensing bulb 144. A third cable 200 is connected with the solenoid valve 72 associated with the steam supply control valve 62. A fourth cable 202 is connected with the steam pressure switch 42. Current to the various electrical components mentioned above is supplied to the control unit 6 through a main cable 204 connected with a source of 115-volt, 60 cycle alternating current.

FIG. 11 is a schematic view of the circuitry of the control unit 6 for a single vault 4, wherein the contacts of each of the various relays are shown in the position they assume when the relay coil is de-energized. The energizing of any relay coil will, therefore, close any normally open contacts of that relay as well as open all normally closed contacts of that relay.

A source of 115-volt, 60 cycle alternating current is diagrammatically indicated at 206 and two main conductors 208 and 210 extend therefrom to a terminal block 212 and in particular to terminals A1 and A2. The terminals A1 and A2 are connected by conductors 214 to a manually operated switch 216, which, when closed, supplies current to terminals 218 and 220, connected with the main on-off switch 172 previously referred to. The primary winding 219 of a transformer 221 is energized through conductors 223 and 225 when the control circuit switch 216 is closed.

The main steam control circuit comprises a conductor 222 extending from a terminal 224 of the main switch 172, a conductor 226 connected with the conductor 222 and with the contact 228, which engages the normally closed contact 230 of a relay 232, back through a conductor 234 connected with the contact 230, to normally closed contacts 236 and 238 of relay 240, then through terminal A4 to the coil 246 of the solenoid valve 72, then through a conductor 248 to terminal A3 and then through a conductor 250 to the terminal 220. A parallel circuit exists from terminal A3 through a conductor 252 to terminals 254 and 256 of a relay coil 258, and back to the terminal A4 through a conductor 260. The normally open contacts 262 and 264 of the relay 258 are connected by a conductor 266 with the terminal A6. A conductor 268 connects the terminal A6 with one terminal 270 of the pressure switch 42, which it will be understood initiates starting of the steam generator unit 2. A conductor 272 connected with the terminal 220 completes a first lighting circuit to the green signal light 190, through normally closed contacts 274 and 276 of the relay 258, the latter contact being connected by a conductor 278 with the terminal 220 of the main switch 72.

An alternative lighting circuit is available through normally open contacts 280 and 282 of the relay 258 which provides current to the red signal light 188, through the conductor 278 and the main switch terminal 220. Upon switching to the steeping circuit, there is energized the coil of the relay 240, through the main switch terminal 224, through conductor 222, conductor 226 and through the normally open contacts 228 and 284 of the relay 230, and returning through conductor 286, through the coil to the main switch terminal 220. The coil of the relay 240 is also energized upon manual closing of the steam cycle by-pass switch 174, through a circuit traced from the switch terminal 218, conductor 222 and contacts 290 and 292 of the switch 174, and then through the relay coil returning to the terminal 220.

The coil of a relay 294 is connected in parallel with the coil of the relay 240 and, therefore, will also be energized upon manual closure of the steam cycle by-pass switch 174, or through automatic closure of the contacts 228 and 284 of the relay 232.

When the main switch 172 is closed, the red light 176 is lighted by a circuit traced from the terminal 218, through conductor 222, normally closed contacts 236 and 238 of the relay 240, conductor 296 and terminal 220. The red light 178 will be energized by a circuit in parallel with that described above when the normally open contacts 298 and 300 of the relay 240 are closed.

Energization of the coil of relay 294 causes its normally open contacts 302 and 304 to close, thereby completing a circuit through the clutch coil CC, as well as through the motor 306 of the manually settable steeping cycle timer 192. A circuit is also completed through the light 194 of the timer 192 upon closure of the same contacts. Energization of the timer motor 306 causes a dial hand with which terminal 308 makes contact, to move counter-clockwise toward a terminal 310. When engagement has been made between the contacts 308 and 310 and the dial hand reaches zero, contacts 310 and 312 are mechanically opened. Thus, current to the motor 306 is cut off and the signal light 194 goes out.

A steam cycle controller is generally indicated at 314 and includes the condensate temperature sensing thermistor 146, which is connected by conductors 316 and 318 as one leg of a temperature indicating bridge circuit 220. The other three legs of the bridge are formed by resistors R4, R5 and R6. The condensate temperature indicating thermometer 180 is connected across two opposite terminals 322 and 324 of the bridge circuit. The other two terminals 326 and 328 of the bridge are energized by a constant direct current voltage, derived from the combination of the resistors R1, R2, R3 and Zener diode CR1, in a well-known manner. Resistor R2 may be adjusted in order to calibrate the condensate temperature thermometer 180. This constant voltage source is energized by a direct current voltage from the amplifier power circuit through conductors 330 and 332.

The other condensate temperature sensing thermistor 148 is connected by conductors 334 and 336 as one leg of a condensate temperature set point bridge circuit 338. The other three legs of this bridge are formed by a resistor R7, adjustable resistor R8, and resistor R9. The resistor R8 may be adjusted by rotating the control dial 182 associated with the condensate temperature thermometer 180. Two opposite terminals 340 and 342 of this bridge are energized by a 6 volt, low alternating current through conductors 344 and 346 from a secondary winding 348 of the transformer 221. The output of the bridge 338 is taken between terminals 352 and 354 and is fed into the amplifier 356 through conductors 358 and 360.

The voltage output of a center-tapped secondary winding 362 of the transformer 221 is full wave rectified in order to supply direct current to the amplifier 356 through conductors 364 and 366. The amplifier 356 is a three-stage, alternating current amplifier of conventional design, which serves to amplify the output current flow from the condensate temperature set point bridge circuit 338. The output of the amplifier 356 is fed to a synchronous detector 368. An adjustable gain control on the amplifier 356 determines the switching voltage differential level of the controller 314.

The voltage induced in the secondary winding 370 of the transformer 221 is half-wave rectified to provide the 25 volt, 0.01 ampere input to the synchronous detector 368. The detector circuit phase completes the output of the amplifier 356 with the voltage developed in the rectified output of the secondary transformer winding 370.

When these two voltage signals to the synchronous detector 368 are in phase, the coil of relay 232 will be energized. Conversely, when the two signals are out of phase, the relay will be de-energized.

A steep cycle controller and indication circuit board is generally indicated at 372 in FIG. 11. The internal circuitry of this unit is identical to that of the steam cycle controller 314. Accordingly, numerals with the letter *a* added will be used when referring to corresponding elements of the controller 372.

The external connections to the controller 372 are quite similar to those of the steam cycle controller 314. Thus, conductors 222a and 296a supply 115 volt AC power to the primary winding 219a of a transformer 221a. The thermistor 140 contained within the vault temperature sensing bulb 138 is connected in circuit with the thermometer 184 by conductors 374 and 376. Similarly, thermistor 142 is connected through conductors 378, 380 in an electrical circuit with the atmospheric temperature set point bridge circuit 338a within the steeping cycle controller 372.

Contacts 230a and 228a of the relay 232a are normally open when the coil of that relay is de-energized. However, when the coil is energized to close these contacts, the main steeping cycle control circuit is completed from the terminal 224 through conductor 222a, primary coil 218a, contacts 382, 308 on the steeping cycle time indicator 192, conductors 384, contacts 203a and 228a, through a conductor 386 to the contacts 388 and 390 of the relay 240, through terminal A4 to the solenoid valve 72 and back through conductors 248 and terminal A3 to the terminal 220.

The circuit of a repeat cycle timer 396 is also shown in FIG. 11. The circuit is optionally provided in order to periodically start the steam generator 2 and thereby prevent it from freezing during winter operation when the steaming vault 4 is not in continuous use. A timer motor 394 is energized from the 115 volt power source by connections to lines 208, 210. The motor 394 is continuously operated and drives a mechanism which opens and closes contacts 398, 400 according to a set repeating cycle. For example, the timer may be designed so that contacts 398, 400 will be actuated to a closed position for a ten minute period occurring once during each complete cycle of the timer, which may be four hours. As contacts 398, 400 are closed a circuit is completed to the steam pressure switch 42, causing the steam generator to be started and run so long as the circuit is maintained. Generally, operation of the steam generator for approximately ten minutes every four hours is sufficient to prevent damage from freezing.

FIG. 12 is a more complete schematic diagram of an electrical circuit for the steam cycle controller unit 314. The electrical circuit for the steep cycle controller 372 is identical with the schematic for the controller 314, except for the alteration in the relay 232a previously noted.

Conductors 223, 225, 226 and 286, and 332, 334 and 336 are shown connected to transformer 221, relay 232 and the vault atmosphere temperature set joint bridge circuit 338 in a manner corresponding with FIG. 11.

A negative supply terminal 410 of the amplifier 356 is shown connected with capacitor C7, resistor R20, and capacitor C6 to the center tap of secondary transformer winding 370. A positive supply terminal 412 is connected through resistors R20 and R21 to the common junction 414 of the rectifier diodes CR3 and CR4. Resistors R22 and R23 are connected in series between the terminals 410 and 412, as are resistor 24, collector emitter circuit of the first stage amplifier transistor Q1, and resistor 25. Capacitor C1 is connected between conductor 416 and the by-pass of transistor Q1, and capacitor C2 connects the common junction 418 of R22 and R23 with the common junction 420 of R24 and the emitter of Q1.

Resistors R26 and R27 are also shown connected in series between the terminals 410 and 412, with their common junction 422 connected to the base of transistor Q2. Capacitor C3 connects junctions 420 and 422, while capacitor C4 is connected in parallel with R25. Resistor R28 is connected in series with the collector emitter circuit of the second stage amplifier transistor Q2 between the terminals 410 and 412. Resistor 29 and diode CR5 are connected in series between terminal 412 and the common junction 424 of R28 and the collector of Q2.

The emitter collector circuit of the third stage amplifier transistor Q3 is connected in series with resistors R30 and R31 between the terminals 412 and junction 422. A series circuit comprising the secondary winding 362, diode CR2 and the parallel combination of capacitor C5 and the coil of relay 232, is connected between the emitter and the collector of transistor Q3. The base of Q3 is directly coupled to the common junction 424 of R29 and CR5.

The following are typical values and manufacturers' identification numbers of components used in the construction of the amplifier and synchronous detector described herein:

|  | Mfd. |
|---|---|
| C1 | 100 |
| C2 | 22 |
| C3 | 15 |
| C4 | 500 |
| C5 | 100 |
| C6 | 100 |
| C7 | 100 |

|  | Ohms |
|---|---|
| R20 | 15 |
| R21 | 12 |
| R22 | 15,000 |
| R23 | 1,500 |
| R24 | 820 |
| R25 | 100 |
| R26 | 5,100 |
| R27 | 820 |
| R28 | 510 |
| R29 | 200 |
| R30 | 2,000 |
| R31 | 40,000 |

| CR2 | No. TI-56 |
|---|---|
| CR3 | No. TI-56 |
| CR4 | No. TI-56 |
| CR5 | No. TI-56 |
| Q1 | No. 980-243 |
| Q2 | No. 980-243 |
| Q3 | 2N178 |

The present invention is not necessarily limited to the details of circuitry of the amplifier and synchronous detector described herein. Rather, any amplifier design which will satisfactorily function in the system described would be suitable for operation in conjunction with the novel system and method of the present invention. The transistor amplifier described is considered to be of advantage since its design will permit economical operation for long periods without maintenance.

Experiments with the present invention have established that for each different specie of wood, a given condensate temperature and steaming time will best condition the logs for peeling. It has also been determined experimentally what the atmospheric vault temperature should be for different species of wood and what the length of the steeping time should be to place the logs in the ideal condition for delivery to the peeling lathes. Thus, the following table shows typical values for average steaming time, condensate temperature, steeping time and atmospheric vault temperature for several common species of wood:

TABLE

| Wood specie and Diameter | Average steaming time (hrs.) | Condensate temperature (°F.) | Steeping time (hrs.) | Atmospheric vault temperature (°F.) |
| --- | --- | --- | --- | --- |
| Southern pine (North Carolina) 8″ to 24″ | 5¾ | 125 | 2½ | 140 |
| Spruce (Engleman-Montana) 12″ to 24″ | 4¾ | 135 | 2 | 145 |
| Fir (Montana-Douglas) 8″ to 18″ | 5½ | 140 | 2 | 150 |
| Fir (Pacific Douglas) 20″ to 30″ | 20 | 188 | 4 | 165 |
| Larch (Montana) 8″ to 20″ | 5½ | 145 | 2 | 155 |

The values set forth in the above table have been determined by actual trial and error methods, although they are consistent with the known relationship that heat transfer through wood is inversely proportional to the density of the wood. Moreover, it is to be understod that the values given above will vary for a particular specie of wood depending upon the growth area. In addition, the values given for the condensate and atmospheric vault temperatures should be adjusted upwardly 5° F. to 10° F. for winter operations when frozen logs are being heated.

The vault 4 and its associated control system are designed so that normally, at a selected temperature, the nozzle pressure and discharge orifice size will deliver the necessary volume of steam to provide satisfactory operation. All of the values given correspond to a fully charged vault and are based upon the delivery of about 0.45 pound of steam and water per hour per cubic foot of vault volume, or 263 B.t.u. per hour per cubic foot of vault volume. However, the steam delivery rate can vary from 0.4 to 0.5 pound per hour per cubic foot of vault volume. If a small charge of logs is used, more volume is available to be occupied by steam, and therefore a higher pressure and heating temperature will be required to place the logs in suitable condition in the same time period. In some extreme cases, the vault may require as much as four to five pounds of saturated steam per hour per cubic foot of vault volume.

THE SYSTEM OPERATION

The operation of the present system is as follows:

Assuming that the vault 4 has been previously used, it is necessary, before loading the vault 4 with logs to clean it in order to remove any chips, bark and other debris remaining from such previous use. It is particularly important to clear the condensate drainage trench 96 and the opening 92 at the rear wall 88 (or any other drainage location) of the vault. The sleeve 150 and the condensate temperature sensing bulb 144 should be removed, cleaned and replaced. This will insure that the condensate will drain quickly and the condensate temperature sensing bulb 144 will provide accurate readings on the condensate thermometer 180.

The cleaned vault is then charged with any mixture of logs of suitable size, regardless of moisture condition, or temperature. The logs are stacked upon the supports 98 so that they are spaced from the floor 82. The logs are also stacked so that their ends are spaced from the side walls 84 and 86 of the vault 4, as shown in FIG. 2. The provision of such spacing insures the necessary circulation of the steam over the entire surface of all of the logs. That is to say, the spaces permit the formation of a turbulent blanket of steam and moisture at the ends of and beneath the logs. This results in a uniform dispersion of heat throughout the stack and provides good moisture coverage of all of the logs. In the prior art, the log supports, if provided at all, were normally positioned near the vault side walls. Such placement, when coupled with the accumulation of wood chips and bark which was usually permitted to build up on the vault floor, prevented the free circulation of steam beneath the log stack.

The high moisture content of the steam introduced into the vault through the nozzles 112, is also essential since it forms a wet film on the entire surface of the logs and serves as a conductor to transfer the latent heat of the steam into the logs at a high rate. The formation of the blanket of steam throughout the length and height of the side walls 84 and 86 assures the presence of ample moisture at the ends of the logs where it can penetrate the fibers more quickly than through the sides of the logs. In order to provide the proper atmosphere in the vault 4 for best results, the moisture content of the steam should be at least equal to the fiber saturation point of wood, which is 30% of dry weight. Thus, steam with a moisture content as low as 20% by weight may be partially satisfactory in heating the logs, but better results are obtained with a moisture content of the steam in the range of 30% to 70% by weight, with 55% being a preferred value to be used in practicing the present method.

The maintenance of a film of moisture on the surface of the logs prevents moisture from being withdrawn from the logs that are partially dried and inhibits seering of the surface of the logs to maintain open the tubes or rays, which extend radially from the center of the log to its outer surface. Since these rays extend through the cell structures, any pressure built up by heating of moisture within the cells is relieved through the rays so that cell fiber rupture does not occur.

After the vault has been charged with logs, it is sealed by closing the door 104. The hatches 134 and the rear door 94 are also closed with the condensate sensing temperature bulb 144 and the amtospheric temperature sensing bulb 138 in place. Since the steam generator 2 is wired for automatic operation by the control unit 6, its starting and control will be initiated by turning on the "On-Off" switch 172 on the control panel 170. In order to regulate the flow of steam to the vault 4 in properly timed cycles, values must be selected for the condensate temperature, vault atmospheric temperature and the time and duration of the steeping cycle. The ideal values for any specie of wood are selected from a table, such as Table I, supra, wherein the given values have been determined impirically by trial and error.

The parameter of condensate temperature is used to determine the duration of the steaming cycle. Assuming that the vault is loaded with southern pine, the condensate temperature for this species of wood is 125° F., so that the knob 182 on the condensate temperature meter 180 is set to such temperature. The steeping temperature for this particular specie of wood is 140° F. so that the knob 186 of the vault atmosphere thermometer 184 is set accordingly. The steeping period for southern pine is about 2½ hours, so that the timer dial 192 is set for 150 minutes.

Since neither of the set temperatures will be present in the vault 4 when the steaming operation is started, the master valve 46 will be open as will also the steam supply control valve 62. Hence, steam will be introduced into the vault 4 through the pipes 106 and discharged through the nozzles 112. As steam is injected into the vault 4, the logs become wet and initially absorb heat at a rapid rate, which results in low atmospheric and condensate temperatures. As the temperature of the logs rises and the temperature differential between the logs and the steam being introduced narrows, the condensate temperature will gradually rise as will also the temperature of the atmosphere in the vault.

It has been found that there is a definite relationship between the temperature of the logs and the temperature of the condensate. Using the prescribed condensate temperature as a criteria, this eliminates the necessity for consideration of other variables, such as the number of logs in the vault, hardness, moisture content of the logs, and the initial temperature of the logs, which can vary considerably, particularly during cold weather operation when the logs may be in a frozen condition. The saturated steam is continually introduced into the vault 4 at a nozzle pressure between 40 and 100 p.s.i.g. and preferably 60 p.s.i.g. (the latter being typical for a vault 14' high). Since the vault is at substantially atmospheric pressure, the steam at 60 p.s.i.g. explodes or flashes down to atmospheric pressure and 212° F. and has a total B.t.u. content per pound of approximately 635, approximately 55% moisture content by weight with approximately 540 B.t.u. per pound of steam by weight and approximately 95 B.t.u. per pound of liquid by weight above 32° F. The supply of steam is continued until the condensate temperature reaches the value for which the condensate thermometer 180 has been pre-set, which causes the steam supply valve 62 to close, thus ending the steaming cycle, which may last 5¾ hours. For other species and growth pattern of wood, the steaming cycle time may be as low as 4 hours and as high as 20 hours; and in the case of frozen logs, an increase in steaming time may be as much as 33%. At the end of the steaming cycle, the outside of the logs is at a higher temperature than the core of the log. Since it is desirable to obtain a uniform temperature gradient throughout each log before it is delivered to a lathe to be peeled into veneer, the steeping cycle is provided. This steeping cycle is automatically started at the end of the steaming cycle and will continue for such period of time as the timer dial 192 has been set to provide. During the steeping cycle, the desired atmospheric temperature of 140° F. is maintained on the average within a range of values of 135° F. to 145° F. for the desired time interval in order to allow fiber temperatures within the logs to equalize.

At the end of the steaming cycle, the atmospheric temperature within the vault 4 will have risen to a value which is close to but not quite as high as the ideal atmospheric temperature for steeping the logs. Should the atmospheric temperature become lower than the set value, additional steam will be admitted to the vault 4 as may be necessary to raise the temperature to the desired steeping temperature. The temperature selected will provide adequate heat during the steeping cycle and also maintain the logs at their ideal condition of plasticity for any required length of time during the selected time cycle. As has been stated above, the minimum steeping cycle time required for a given species of wood is pre-set on the timer 192, which when the steeping cycle is in progress will indicate the minimum time remaining, or will indicate if the minimum time has elapsed and the vault can be opened and the conditioned blocks removed to the lathe. The temperature sensing bulb 138 controls the steam supply valve 62 during the steeping cycle to maintain a substantially uniform temperature, in the vault by effecting the introduction of more saturated steam, as required.

Should the lathe not be ready to receive the logs, the steeping cycle continues as previously described. Should the vault be partially unloaded and reclosed, a steeping holding cycle can then be instituted by pushing the steaming by-pass switch button, also as previously described.

With reference to the functioning of the control circuit, the system is started by moving the switch 172 to the "ON" position, so that the terminal 218 will contact the terminal 224, FIG. 11. This energizes the main steaming control circuit from the switch 172 to the relay contacts 230, 228 and contacts 236 and 238 to open the solenoid valve 72 which, in turn, will permit the steam control valve 62 to open and admit steam into the vault through the main steam pipe 44 and the steam distribution pipes 106. This same circuit energizes the parallel wired coil of the relay 258 and operates its contacts. Closure of contacts 262 and 264 completes a circuit to the steam pressure switch 42 to start the steam generator 2. The closure of the contacts 280 and 282 will light the red light 188 to indicate that the main steam valve 46 is open, and the simultaneous opening of the contacts 274 and 276 will turn out the green signal light 190.

Closing of the main switch 172 also energizes the red light 176 through normally closed contacts 157 and 159 of the relay 240 to indicate that the steaming cycle is in progress. As the steaming cycle continues, the rising condensate temperature will be sensed by the thermistors 146 and 148 and the condensate temperature will be displayed on condensate thermometer 180 from the signal fed from the thermistor 146 to the bridge circuit 320. The signal from the thermistor 148 is fed to the condensate set point circuit 338. When the actual condensate temperature rises above the value set on R8 by the dial 182, the amplified output of the set point circuit 338 will become in voltage in phase with the signal from the secondary winding 370 of the relay 221. This phase identity is sensed by the synchronous detector 368, causing energization of the coil of relay 232 to open the contacts 230 and 228 and to close the contacts 228 and 284. Closure of the contacts 228 and 284 energizes the coil of the relay 240 and operates its contacts. Therefore, contacts 236 and 238 open to de-energize the circuit to the solenoid valve 72. This will close the steam supply 62 and terminate the steaming cycle. Also, contacts 157 and 159 are opened to turn off the red light 176, and contact pairs 159, 161 and 163, 165 are opened to break the circuit from thermistor 146 to the set point circuit 338.

At the same time, opening of the contacts 236 and 238 de-energize the coil of relay 258, thereby deactuating the steam pressure switch 42 and momentarily turning off the steam generator 2. Red signal light 188 is also turned off, and green signal light 190 is turned on to indicate that the valve 46 is closed. Contacts 298, 300 are closed by the coil of relay 240 and red light 178 is turned on to indicate that the steeping cycle is in progress. Closure of the contacts 388 and 390 on the relay 240 transfers control of the solenoid valve circuit to the steeping cycle controller 372. Completion of the circuit through the contacts 388 and 390 also energizes the coil of relay 294, closing contacts 302 and 304 and supplying current to the circuit of the timer indicator 192. Completion of this circuit starts the motor 306, which advances an arm on its dial towards zero and moves contact 308 towards contact 310. Light 194 is turned on to indicate that the timer 192 is in operation.

The atmospheric temperature within the vault 4, is sensed by thermistors 140 and 142, which are internally connected to the steep cycle controller 372 in a manner identical with the corresponding connections shown for the steam cycle controller 314. During the steeping cycle, the coil of the relay 232a of the controller 372 will be energized so long as the vault atmospheric temperature exceeds that set on the dial 186. This will maintain contacts 228a and 284a closed and the steam valve 62 will be closed. Whenever the atmospheric temperature falls below the set value, the relay coil will be de-energized and contacts 230a and 228a will close. The closure of these contacts will energize the steeping control circuit and open the solenoid pilot valve 72 to permit the steam control valve 62 to open and supply more steam to the vault 4. As the atmospheric temperature returns to the set value, contacts 230a and 228a will open. The solenoid valve 72 will be de-energized and the steam control valve 62 will close.

As the steeping cycle is completed, contacts 308 and 310 of the timer 192 will make contact, short circuiting and stopping the motor 306 and extinguishing the dial signal light 194. The operator may then turn the main switch 172 to the "Off" position in order to de-energize the control unit 6 in preparation for opening the vault door 104. This will also automatically reset the timer 192. Alternatively, should the veneer lathe schedule not require fresh logs at this time, the operator may simply leave the controls as they are and the control unit 6 will continue to hold the atmospheric temperature at the set level for an indefinite period of time, by internally supplying steam to the vault in the manner previously explained.

In the event that it is desired, the control unit 6 may be switched off, the vault 4 partially emptied, and the vault resealed. In order to hold the remaining logs at the ideal condition of plasticity, the control unit 6 is switched "On" and the steam cycle by-pass switch 174 is manually operated. Closure of the switch 174 immediately energizes the coil of relay 240 and transfers control of the vault 4 to the steeping cycle controller 372. The controller 372 will then operate on a holding cycle in the manner previously explained to inject steam into the vault until the atmospheric temperature returns to the set point.

I claim:

1. The method of heating and steaming logs in an enclosed zone with high moisture content steam, selected to approach, equal or exceed the natural fiber saturation point of various species of logs, to conditions the same for cutting into veneer, comprising: the steps of placing the logs in the enclosed zone; subjecting the logs to steam of a high moisture content; and using a predetermined steam condensate temperature value as the criteria for determining the duration of the steaming cycle.

2. The method as defined in claim 1, in which the logs are subjected to a steaming cycle of a duration of about four to twenty hours.

3. The method as defined in claim 1, including using a condensate temperature value in the range of approximately 115° F. to 188° F.

4. The method as defined in claim 1, including subjecting the logs to steam having such moisture content that it will not withdraw moisture from the logs but will restore moisture in the logs.

5. The method as described in claim 1, including subjecting the logs to steam that has a selectable range in moisture content of approximately 20% to 70% by weight, and introducing the steam into the enclosed zone at a nozzle pressure selectable over a range of approximately 40 to 100 p.s.i.g. pressure, and at a selectable rate of approximately 0.4 to 0.5 pound of saturated steam per hour per cubic foot of volume of said enclosed zone, and maintaining the enclosed zone under substantially atmospheric pressure so that the high moisture content steam explodes or flashes to atmospheric pressure and equivalent steam temperature.

6. The method as described in claim 1, including introducing the high moisture content steam into the enclosed zone at approximately 60 p.s.i.g. nozzle pressure where it explodes or flashes down to atmospheric pressure and 212° F. temperature and has a total B.t.u. content of approximately 635, approximately 55% moisture content by weight, approximately 540 B.t.u. per pound of steam by weight, and approximately 95 B.t.u. per pound of liquid by weight above 32° F.

7. The method as defined in claim 1, including the additional step of subjecting the logs to a steeping cycle for a predetermined period of time and at a predetermined temperature higher than the predetermined condensate temperature value.

8. The method as defined in claim 7 including steeping the logs at a temperature of approximately 130° F. to 185° F. for a period of about two to four hours.

9. The method of conditioning logs or veneer blocks by heating and plasticizing uniformly throughout the log or block, without destructive effects on the fiber structure, or resaturating and heating logs or blocks having moisture depletion below the natural fiber saturation point of the species for cutting into veneer, comprising the steps of: stacking the logs to be conditioned in an enclosure so that said logs are bodily spaced from the bottom wall of said enclosure and their ends are spaced from the side walls of said enclosure to provide space so that said logs can be completely enveloped in an atmosphere of high moisture content steam; downwardly injecting saturated high moisture content steam that can range by selection from about 20% to 70% moisture by weight, depending upon steam pressure or requirements of wood species, and under a nozzle pressure of from about 40 to 100 p.s.i.g. pressure at the opposite sides of said enclosure from a region higher than the stacked logs, in a manner to form a blanket of steam at the ends of said logs extending for substantially the full height and length of the side walls of said enclosure.

10. The method as defined in claim 9, including the step of: continuing the injection of such steam until the temperature of the steam condensate reaches a predetermined value between about 115° F. and 188° F.; and then discontinuing said injection.

11. The method as defined in claim 9, wherein the injection of steam into the enclosure is continued until the logs or blocks reach the maximum fiber saturation point of the species or about 30% of dry weight, and the logs or blocks have absorbed heat that will result in the predetermined condensate temperature.

12. The method as defined in claim 9, including the step of injecting the steam under sufficient pressure that it impinges against the floor at the walls of the enclosure to be blanketed by the steam, exploding or flashing down to atmospheric pressure and 212° F., resulting in a state of turbulence that completely envelopes the blocks from end to end and bottom to top, and circulating under and between said logs or blocks.

13. The method as defined in claim 9, including the step of injecting the steam in a series of flat, fan-shaped jets, with adjacent jets overlapping so that a continuous blanket of steam is maintained in the enclosure at the opposite ends of the logs.

14. The method as defined in claim 10, including the further step of supplying steam to the enclosure to steep the logs and maintain the atmospheric temperature in said enclosure within a selected range of temperature and time values to enable the logs to become uniformly heated and saturated from exterior to core.

15. The method as defined in claim 14, including the step of intermittently introducing steam into the enclosure following steeping to maintain the logs in the desired condition until removed from the vault.

16. The method as defined in claim 9, in which the steam has a substantially greater percentage of moisture content by weight than the normal growth saturation value of the wood fibers of the logs being conditioned.

17. Apparatus for heating and saturating logs to condition the same to be cut into veneer, comprising: means providing an elongated generally rectangular concrete enclosure for the logs to be conditioned; means for introducing saturated steam into said enclosure for initiating a steaming cycle for heating and saturating the logs; and means controlling the duration of said steaming cycle including an element at least partially immersed in and responsive to the temperature of the condensate of said steam for controlling the supply of said steam to said enclosure.

18. Apparatus as defined in claim 17, wherein the means responsive to the temperature of the steam condensate, comprises: temperature sensing means to measure the condensate temperature; and a steam supply control valve automatically closed by said temperature sensing means when the condensate temperature reaches a given value.

19. Apparatus as defined in claim 18, including means in said vault responsive to the atmospheric temperature in said vault and rendered automatically operative at the conclusion of the steaming cycle to initiate a steeping cycle for the logs; and pre-settable means cooperating with said vault atmospheric temperature responsive means for controlling the temperature and duration of said steeping cycle.

20. Apparatus as defined in claim 19, including means optionally operable upon completion of the steeping cycle to initiate a holding cycle and to control the steam supply control valve to intermittently open said valve to maintain the logs in the desired condition until removed from the enclosure.

21. Apparatus for heating and saturating logs to condition the same to be cut into veneer, comprising: means providing an enclosure for the logs to be conditioned; automatic means for introducing saturated steam into said enclosure until the temperature of the condensate of said steam reaches a predetermined value; and automatic means for effecting steeping of the logs in said enclosure for a predetermined period of time and at a predetermined temperature, after the condensate temperature has reached said predetermined value.

22. Apparatus as defined in claim 21, including signal means for indicating that the steaming cycle is in progress and for indicating that the steeping cycle is in progress.

23. Apparatus as defined in claim 21, including holding cycle means for holding the logs at a given temperature after termination of the steeping period cycle; and means for indicating that the holding cycle is in progress.

24. Apparatus for heating and saturating logs to condition the same to be cut into veneer, comprising: means providing an elongated generally rectangular concrete enclosure for the logs to be conditioned; means for supplying and introducing saturated steam into said enclosure for heating and saturating the logs; means located within said enclosure for collecting and draining the steam condensate from said enclosure; and temperature sensing means in the path of flow of said condensate and responsive to the temperature of said condensate for terminating the supply of steam to said enclosure when the condensate temperature reaches a predetermined value indicating that the logs have been sufficiently heated and saturated.

25. Apparatus as defined in claim 24, wherein the means for collecting and draining the steam condensate from the enclosure comprises a condensate trench adapted to receive a condensate temperature sensor.

26. Apparatus as defined in claim 25, wherein the temperature sensing means comprises a perforated sleeve removably mounted in the condensate trench and a temperature sensing bulb mounted on said sleeve.

27. Apparatus as defined in claim 24, wherein temperature sensing means is mounted in the enclosure for sensing the temperature of the atmosphere in the enclosure, and wherein means is provided for regulating the flow of steam to said enclosure to maintain a substantially uniform temperature therein for a pre-selected period of time after the logs have been steam treated under the control of the condensate temperature sensing means.

28. Apparatus for heating and saturating logs to condition the same to be cut into veneer, comprising: an elongated vault open at one end and including side walls, a rear wall, a floor, a ceiling and a door for closing said open end; support means on said floor for supporting logs transversely within the vault in spaced relation to said floor and with the ends of the logs spaced from said side walls; means in said vault for continuously forming a blanket of steam between the ends of the said logs and the adjacent vault side walls and for effecting turbulent circulation of said steam about said logs between the ends thereof; means for controlling the supply of steam to said vault; and means responsive to a given temperature of the condensate of said steam controlling said steam control supply means to shut the same off when the condensate temperature reaches said given value.

29. Apparatus as defined in claim 28, wherein the means for forming the blankets of steam comprises a steam distribution pipe arranged along each side wall adjacent the ceiling, each pipe having a plurality of nozzles mounted therein in longitudinally spaced relation, said nozzles having a discharge orifice arranged to produce a generally flat, fan-shaped spray of steam and water and to discharge the same into the space between the ends of the logs and the adjacent vault side walls to form a blanket of steam extending for the full height of said side walls and for the full length of said vault, said jets having sufficient force to cause the steam to impinge against the floor of the vault with substantial velocity.

30. Apparatus as defined in claim 29, wherein bumper elements are arranged adjacent the steam distribution pipes to protect the nozzles against damage as the vault is being loaded or logs are being removed from the vault.

31. Apparatus as defined in claim 28, wherein the rear wall has a clean-out opening, and wherein a door is slidably mounted upon the rear wall and adapted to be closed to obstruct said clean-out opening.

32. Apparatus for heating and steaming logs or blocks to condition the same for cutting into veneer, comprising: a closable vault for receiving the logs to be conditioned; means in said vault for supporting the logs transversely and in spaced relation to the vault bottom and spacing the ends of the logs from the sides of said vault; means for introducing high moisture content steam into said vault to effect a steaming cycle for heating and saturating said logs to heat and restore the moisture content thereof; means for automatically controlling the steaming cycle of said logs including a steam valve for controlling the supply of steam to said vault; electrical control means for said steam valve; electrical means for measuring the temperature of the steam condensate in said vault; condensate temperature settable means connected in circuit with said condensate temperature sensing means and with said electrical control means for said steam valve, manually settable to effect closing of said steam valve when the temperature of the steam condensate reaches a predetermined value indicating that the logs have been sufficiently heated and saturated during the steaming cycle; and signal means connected in circuit with said means controlling said stem valve for signalling that the steaming cycle is in progress.

33. Apparatus as defined in claim 32, including electrical means for sensing the atmospheric temperature in said vault; vault atmosphere temperature settable means connected in circuit with said atmospheric temperature sensing means and said electrical control means for the steam supply valve for controlling the opening and closing of said valve to effect a steeping cycle for said logs or blocks; a timer connected in circuit with said temperature responsive means for indicating the duration of said steeping cycle; and signal means connected in circuit with said timer to indicate that the minimum steeping cycle period is in progress.

34. Apparatus as defined in claim 33, including additional means connected in the circuit for manually re-instituting the steeping cycle or instituting a holding cycle to continue to hold and preserve the condition of the logs or blocks in a partially loaded and reclosed vault for intermittently opening and closing the steam valve to introduce steam into said vault to maintain the logs or blocks in heated condition until removed from the vault.

References Cited

UNITED STATES PATENTS

| | | | |
|---|---|---|---|
| 1,437,839 | 12/1922 | Gilbreath | 34—84 |
| 1,541,349 | 6/1925 | Goss et al. | 34—84 XR |
| 1,754,351 | 4/1930 | Cobb | 34—84 XR |
| 2,102,106 | 12/1937 | Allen | 34—48 |
| 2,713,702 | 7/1955 | Jewell | 21—94 XR |
| 3,150,935 | 9/1964 | Matteson | 21—98 XR |

CARLTON R. CROYLE, *Primary Examiner.*

ALLAN D. HERRMANN, *Assistant Examiner.*

U.S. Cl. X.R.

21—66; 34—30, 45, 48